(12) United States Patent
Kokkinos

(10) Patent No.: US 7,978,952 B2
(45) Date of Patent: Jul. 12, 2011

(54) COVER FOR OPTICAL FIBERS AND/OR OPTICAL DEVICES

(75) Inventor: Dimitrios Kokkinos, Flushing, NY (US)

(73) Assignee: Verizon Services Corp., Ashburn, VA (US)

( * ) Notice: Subject to any disclaimer, the term of this patent is extended or adjusted under 35 U.S.C. 154(b) by 15 days.

(21) Appl. No.: 12/347,634

(22) Filed: Dec. 31, 2008

(65) Prior Publication Data

US 2009/0232466 A1    Sep. 17, 2009

Related U.S. Application Data

(63) Continuation of application No. 11/453,876, filed on Jun. 16, 2006, now Pat. No. 7,526,154.

(51) Int. Cl.
*G02B 6/00* (2006.01)

(52) U.S. Cl. .......................................... 385/138; 385/18

(58) Field of Classification Search ........................ None
See application file for complete search history.

(56) References Cited

U.S. PATENT DOCUMENTS 6,487,327 B1 * 11/2002 Mock ............................. 385/12
6,547,453 B1 *  4/2003 Stummer et al. ................ 385/88

* cited by examiner

*Primary Examiner* — Charlie Peng
*Assistant Examiner* — Mary A El-Shammaa

(57) ABSTRACT

Apparatus and methods are provided for controlling a light emission from an end of an optical fiber by utilizing a cover that blocks the light emission at the fiber end, a detector situated between the fiber end and the cover that detects the blocked emission, and a signaling device, such as an LED, associated with the detector that illuminates in response to the detection of the blocked emission. The apparatus and methods may further provide for the filtering out of light from the emission that is not used for communications. The apparatus and methods may also provide for the attenuation of the power of the emission before the emission reaches the detector.

26 Claims, 6 Drawing Sheets

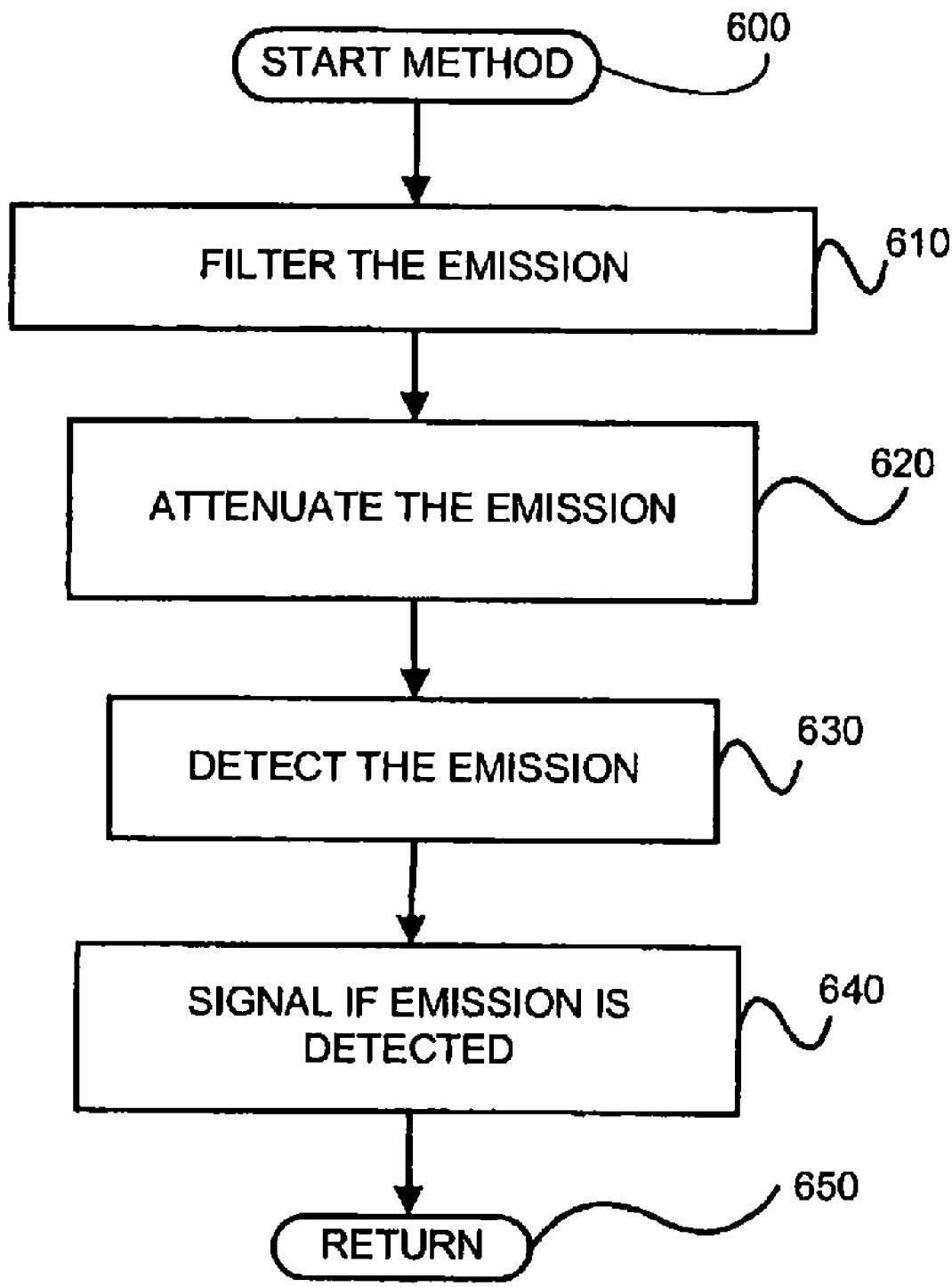

COVER FOR OPTICAL FIBERS AND/OR OPTICAL DEVICES

CROSS REFERENCE TO RELATED APPLICATIONS

This application is a continuation of U.S. patent application Ser. No. 11/453,876, filed on Jun. 16, 2006, which is hereby incorporated by reference in its entirety.

FIELD OF INVENTION

The present invention relates generally to apparatus and methods for controlling the light emissions from an end of an optical fiber.

BACKGROUND

Optical fibers are used for transmitting electronic signals in high-speed data and communications systems. A standard optical fiber contains an inner light transmitting optical core. Surrounding each fiber is an outer protective casing. Optical fibers are utilized in the telecommunications industry, as well as other industries, as a preferred transmission medium because of their ability to carry large amounts of data at high speeds, over long distances.

Optical fibers are often terminated in connectors, so that they can be connected to other fibers or some other device. The "slot" that holds the fiber in position within the connector assembly is known as a ferrule. The precise positioning of the fiber in ferrules is necessary in order to consistently align one end of a fiber with the end of another fiber in a mating connector assembly, or with a device connected to the other end of the connector.

In the telecommunications industry, multiple fibers terminating at the back of a Fiber Distribution Frame (FDF) are connected via fibers within the frame to "ports" on the front side of the frame. These ports have rigid sleeves to hold the connectors in place, and apertures for the ferrules. In this way, the ports can be used to connect other optical fibers or electronic equipment plugged into the ports on the front of the frame to the fibers terminating on the back side of the frame.

If a port on the front side of an FDF is connected through the frame to the back side, and there is no equipment plugged into the port, there would be a fiber "end" exposed at the port. Further, if there is a "live" (powered) fiber connected to the back side of the FDF and associated with that port, the fiber end at the port would be emitting potentially dangerous light. The power level for some current systems with optical amplifiers is approaching 400 mW. For "next generation" systems it is expected to approach 1 W. At these power levels, the emissions could injure the eyes of a person looking at the port.

In order to avoid physical damage to the fiber end at an exposed port, and to avoid possible damage to the eyes of anyone looking at the ports, "dust covers" have been placed over the sleeves to protect both the fiber and the connectors from harmful dust or debris, as well as blocking any laser light emitted from the exposed fiber end. Covers could also be utilized in situations other than an FDF, such as to cover fiber connectors, or to cover fiber ferrules.

In the case of covers over sleeves on FDFs, these covers are routinely removed for long periods of time while service personnel are working on the front of the frame, looking at the ports. If a live optical fiber is connected at the back of the frame, and the port is not immediately tested when the cover is removed, the technician could be injured by the emitted light. Further, if the port is "live" for an extended period of time, the plastic cover could be damaged due to opto-thermal effects of the emitted light.

It would therefore be advantageous for service personnel to know whether a port is "live" before removing a cover from the port. It would also be advantageous to know if an installed cover is covering a live port, so that such a situation could be addressed before damage is done to the cover, or for other operational reasons. For instance, it may very well be a mistake that a "covered" port is live. Therefore, if there were an indication of this situation on a covered port, the problem could be resolved.

It would be further advantageous if the power level of light emitted from an optical fiber under a cover could be reduced while the cover is in place, in order to avoid damage to the cover.

It would be further advantageous if there was an indication that light within the spectrum used for communications was present under the cover, as opposed to extraneous light that would not be potentially harmful.

BRIEF DESCRIPTION OF FIGURES

FIG. 6 is a flowchart of an exemplary method of indicating that an optical fiber under a cover is powered in accordance with the present invention.

DETAILED DESCRIPTION

Figure 1:
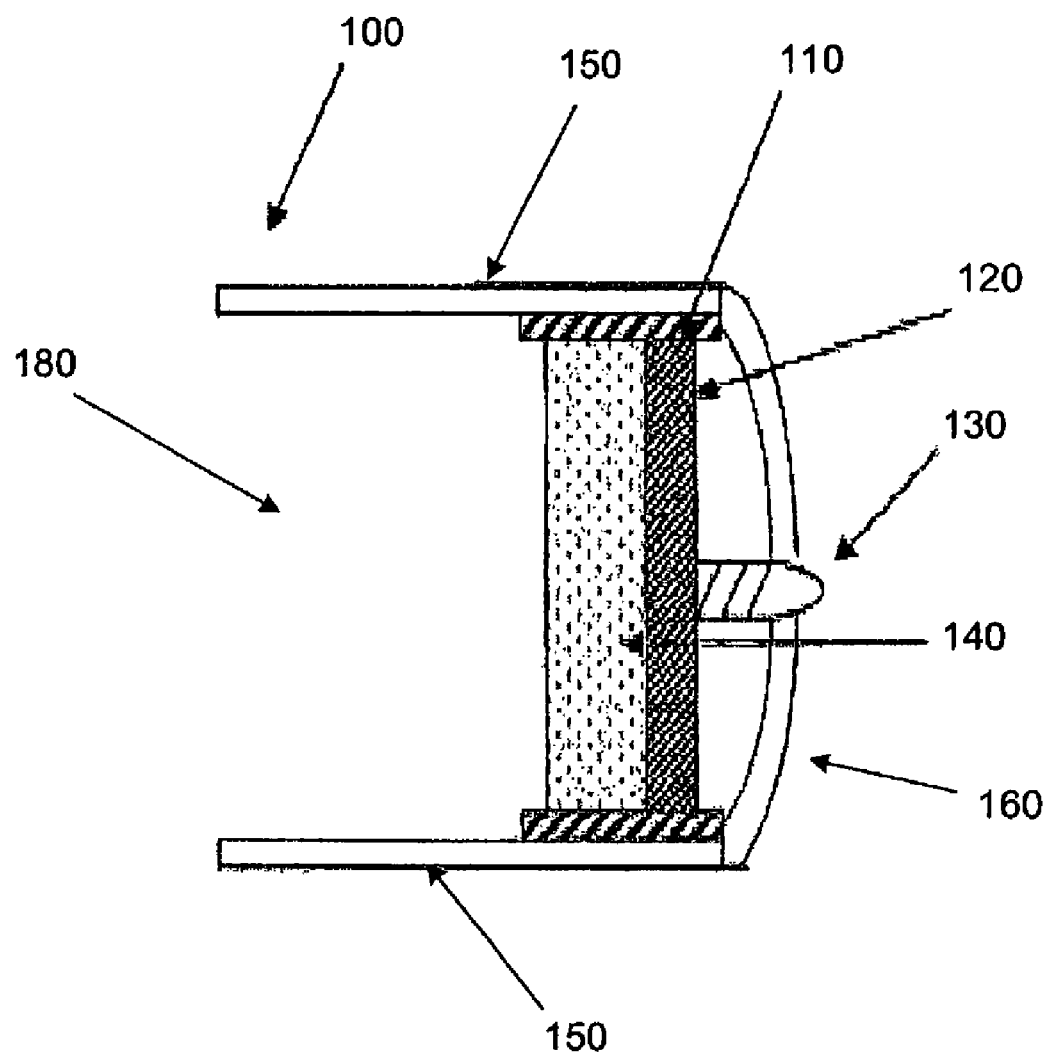
FIG. 1 is a drawing of an exemplary apparatus implemented in accordance with the present invention and using methods of the present invention.

FIG. 1 is a drawing of an exemplary cover 100 implemented in accordance with the present invention and using methods of the present invention. Cover 100 is a cylindrical structure, preferably plastic, and hollow at one end (opening 180). Cover sidewall 150 and cover end 160 would be used to cover the end of an optical fiber, or alternatively to cover a connector coupler containing an optical fiber (not shown). Cover 100 could be considered to be a cap or hood to be placed over the fiber end. Cover end 160 would be preferably composed of an opaque material that would block the light emitted from the end of the optical fiber.

Support ring 110 is a rigid ring member which holds coating 140, photo detector 120, and LED (Light Emitting Diode) 130 in place. Coating 140 may be made up of a material that would filter out a portion of the light spectrum emitted from the optical fiber end in opening 180. For instance, coating 140 could be designed to filter out the portion of the light spectrum that doesn't carry communications. As will be seen more clearly below, this could be used to prevent false indications of harmful emissions from the optical fiber. Alternatively, the designated spectrum to be filtered out could be light that would not be harmful to the human eye. This would prevent the LED from illuminating if none of the detected light would be harmful to the eye. The material of coating 140 could be self-supporting within ring 110, or could be applied to the surface of photo-detector 120.

Alternatively, or additionally, coating 140 may be a material which attenuates the power of the laser light emission passing through it. If the power of the laser beam is such that it could damage cover end 160, this attenuating layer of coating 140 could reduce the power to a safe level whenever cover 100 is in place over the fiber end. Again, this attenuating material could either be self-supporting within ring 110, or could be a coating on photo detector 120. Coating 140 could be designed for various power level applications.

Alternatively, coating 140 could contain a combination of attenuating material and filter material, to simultaneously filter out light of a designated portion of the spectrum and reduce the power level of the remaining light.

LED 130 is affixed to photo-detector 120. This combination of photo detector 120 and LED 130 would transform light emitted from the fiber end through the attenuator/filter of coating 140 to electrical energy, which would illuminate LED 130 with light that could be seen by the naked eye. LED 130 could protrude through an aperture in cover end 160, so that someone looking at cover 100 would be able to see whether LED 130 was illuminated or not. If LED 130 was illuminated, the observer would know that the optical fiber within opening 180 was "live"; i.e., was carrying a light signal. However, as opposed to the light emitted from the optical fiber being dangerous to a technician's eyes, the light from the LED would be safe. This would allow the technician to take further precautions before removing cover 100 from the optical fiber (or the connector coupler encasing the end of the optical fiber).

Figure 2:
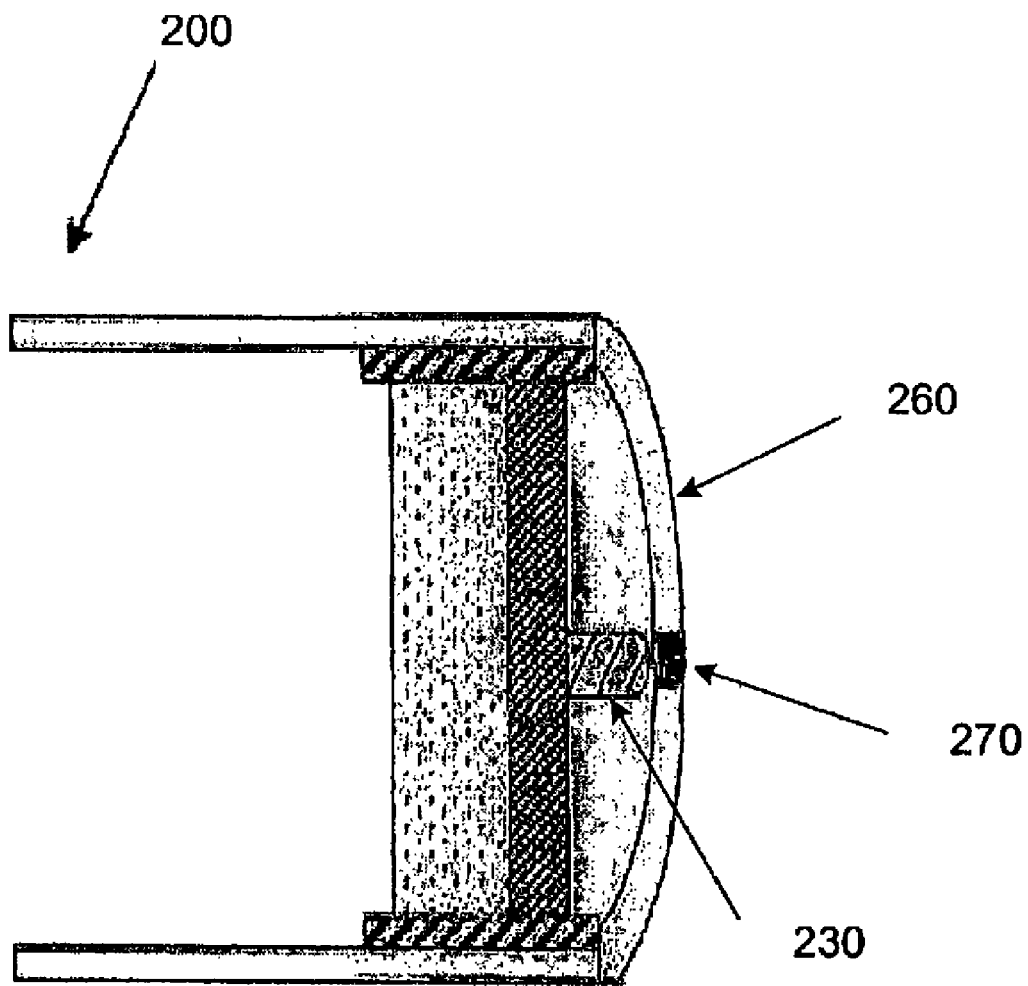
FIG. 2 is a drawing of an exemplary apparatus implemented in accordance with the present invention and using methods of the present invention.

Alternatively, as shown in FIG. 2, instead of protruding through a hole in cover end 260 of cover 200, LED 230 could be situated underneath cover end 260, and a portion 270 of cover end 260 over LED 230 could be made of a translucent or transparent material, which would allow a technician to see LED 230 illuminated beneath the surface of cover end 260. Translucent portion 270 could be sized and situated such that no harmful light from the optical fiber would pass through it.

Returning to FIG. 1, cover sidewall 150 could be of a "neutral" color, such as green or yellow, whereas cover end 160 could be a bright red, signifying that the cap is non-standard; that the connector underneath cover 100 could be a live unterminated connector or link, and could contain an active, high-powered laser beam; and that the technician should look at LED 130 before removing cover 100. This could avoid exposure by the technician to invisible radiation and indicate that proper action must be taken to deactivate or terminate the link.

Cover 100 is a cover or housing that could be manufactured with the fiber or connector, and would be removable. Alternatively, cover 100 could be a stand-alone cover, including the associated support ring 110, coating 140, photo-detector 120, and LED 130, which could be placed over the end of an optical fiber or connector in the field.

Another variation consistent with the present invention would be to install a support ring 110, coating 140, photo-detector 120, and LED 130 into an existing dust cover in the field, and punching a hole in the end of the dust cover for the LED to protrude therethrough. Cover 100 could be placed over the end of an optical fiber in the field, or could be placed over a fiber/connector combination on a Fiber Distribution Frame, or similar situation.

Figure 3:
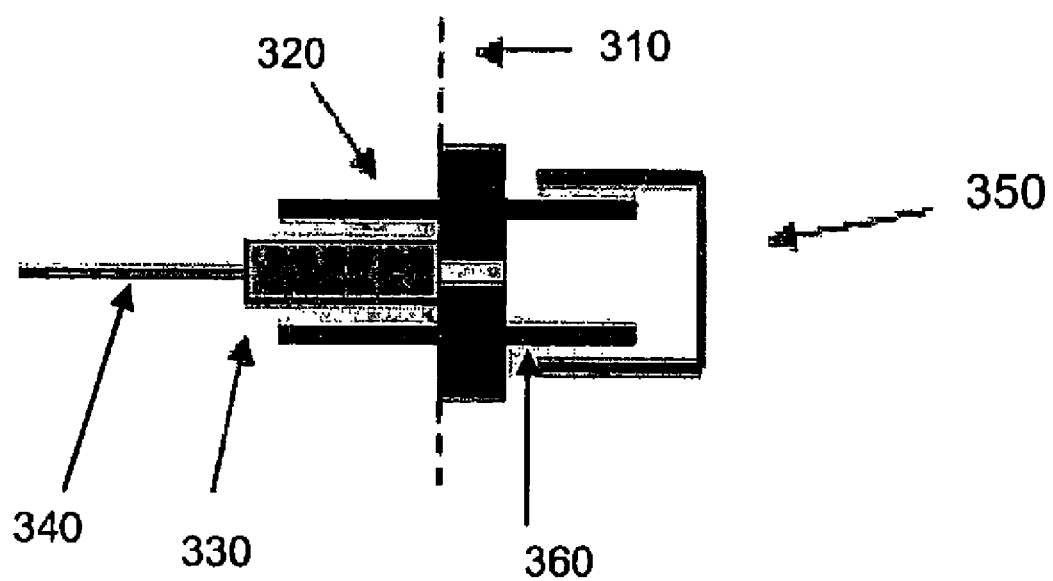
FIG. 3 is a drawing of an exemplary apparatus implemented in accordance with the present invention and using methods of the present invention on a fiber frame.

FIG. 3 shows the side view of a port on a fiber distribution frame. The port includes sleeve 320, which holds connector 330 of fiber 340 in place, and sleeve 360, which is available to hold a connector in place that is to be plugged into the port. An embodiment of the present invention, cover 350, is shown placed over sleeve 360, which would protect sleeve 360 and fiber 340 from dust and debris, and would indicate through an LED (not shown) whether fiber 340 was powered with potentially dangerous light.

Figure 4:
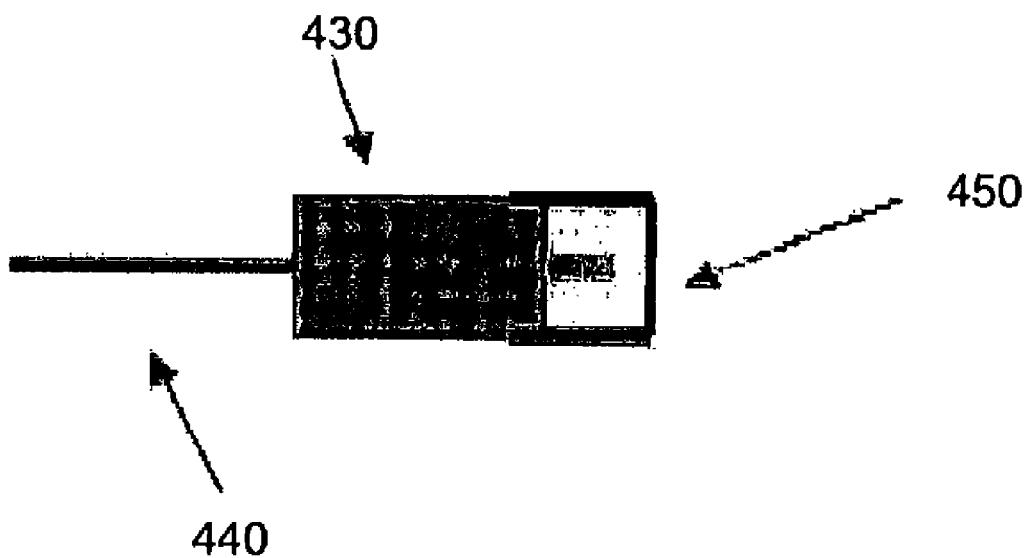
FIG. 4 is a drawing of an exemplary apparatus implemented in accordance with the present invention and using methods of the present invention on a fiber connector.

FIG. 4 shows an embodiment of the present invention wherein the inventive cover 450 is placed over connector 430, which holds fiber 440. In this case, connector cover 450 would not only protect connector 430 and fiber 440, but would indicate whether fiber 440 was powered with potentially dangerous laser light.

Figure 5:
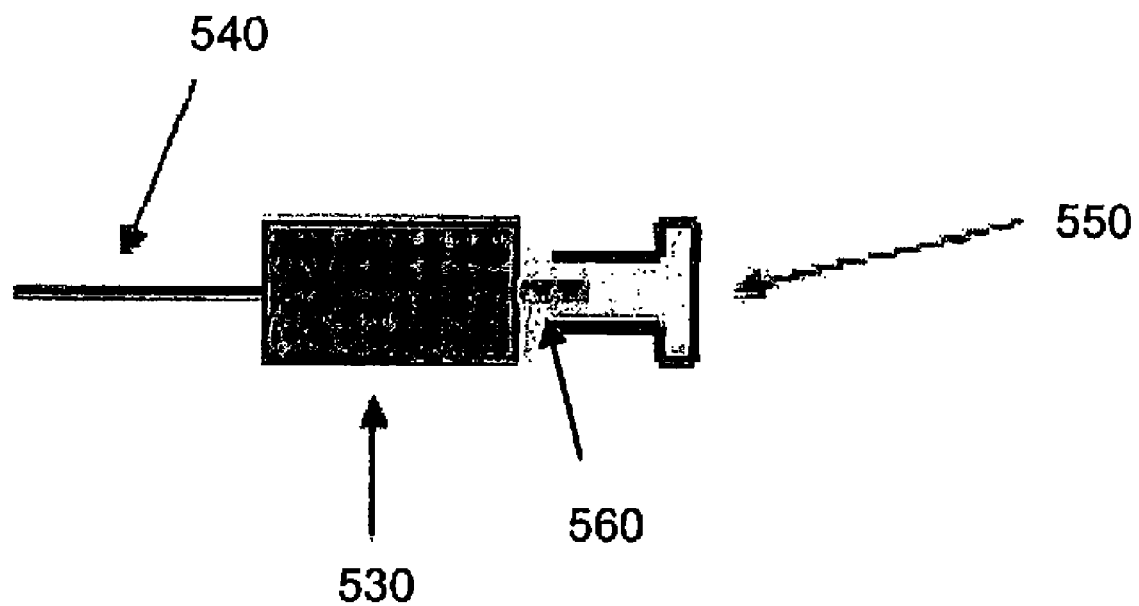
FIG. 5 is a drawing of an exemplary apparatus implemented in accordance with the present invention and using methods of the present invention on a fiber ferrule.

FIG. 5 shows another embodiment of the present invention wherein the inventive cover 550 is placed over ferrule 560, which is encased in connector 530, and holds fiber 540 in place. In this case, cover 550 would not only protect ferrule 560, and fiber 540, but would indicate whether fiber 540 was powered with potentially dangerous light.

FIG. 6 shows the steps that could be taken to implement an embodiment of the present invention. The first step 610 is to filter the emission, to only allow communications-carrying portions of the laser spectrum to pass through. Step 620 (which could also be accomplished with or before step 610) is to attenuate the power of the laser beam before it is detected. It should be understood that both steps 610 and 620 are optional steps, and the invention would be effective without either. Step 630 would be to detect the filtered, attenuated emission from the optical fiber. Finally, step 640 would be to signal, such as with a light, if an emission has been detected at step 630.

The methods and apparatus of the invention can be applied to and/or used with, a wide range of devices. Applications of this invention, in addition to FDFs, include optical devices and subsystems terminated with optical connectors such as optical sources, optical amplifiers, Optical Add Drop Multiplexers (OADM) in Dense Wavelength Division Multiplexing systems. The invention is particularly useful in cases where the devices and/or systems use dangerously high optical power.

Numerous additional variations on the methods and apparatus of the present invention described above will be apparent to those skilled in the art in view of the above description of the invention. Such variations are to be considered within the scope of the invention.

What is claimed is:

1. An apparatus comprising:
   a support mechanism in association with an end of an optical fiber for selectively receiving a light emission from the end of the optical fiber;
   a light detector received by the support mechanism;
   a light adjuster received by the support mechanism; and
   a signaling device in communication with the detector, wherein the signaling device is selectively activated by at least a portion of the light emission.

2. The apparatus of claim 1, further including a cover receiving at least the light detector and the light adjuster.

3. The apparatus of claim 2, wherein the cover is opaque to at least a predefined range of the light emission.

4. The apparatus of claim 2, wherein the cover is at least a portion of the support mechanism.

5. The apparatus of claim 2, wherein the cover is distinct from the support mechanism such that the support mechanism is received within the cover.

6. The apparatus of claim 5, wherein the support mechanism is rigid as compared to the cover.

7. The apparatus of claim 2, wherein the signaling device extends through the cover.

8. The apparatus of claim 1, wherein any light transmitted by the signaling device is non-harmful to the human eye.

9. The apparatus of claim 8, wherein a portion of the light emission adjusted by the light adjuster is at least one of light emission power and a portion of the light emission spectrum.

10. The apparatus of claim 1, wherein the signaling device is a light emitting diode, transforming at least a portion of the light emission to electrical energy.

11. The apparatus of claim 1, wherein the light adjuster comprises a light power attenuating material.

12. The apparatus of claim 1, wherein the light adjuster comprises a light spectrum filter material.

13. The apparatus of claim 1, wherein the light adjuster comprises at least one of a light power attenuating material and a light spectrum filter material.

14. The apparatus of claim 13, wherein the light adjuster is self supporting within the support mechanism.

15. The apparatus of claim 13, wherein the light adjuster is a coating applied to the light detector.

16. An apparatus comprising:
  a cover in association with an end of an optical fiber for selectively receiving a light emission from an end of the optical fiber;
  a light detector received within the cover;
  a light adjuster received within the cover;
  a signaling device in communication with the detector, wherein the signaling device is selectively activated by at least a portion of the light emission; and
  wherein the cover is opaque to at least a predefined range of the light emission.

17. The apparatus of claim 16, wherein the light detector is a frequency detector, the light adjuster is a frequency filter and wherein the signaling device is activated when the frequency detector detects a predefined frequency input of the light emission.

18. The apparatus of claim 17, wherein the detector is a photo-detector that receives optical energy from the frequency input of the light emission, and wherein the photo-detector is configured to convert the optical energy into electrical energy to activate the signaling device.

19. The apparatus of claim 17, wherein the frequency filter is at least a portion of a coating on the frequency detector.

20. The apparatus of claim 16, wherein the light adjuster is configured to attenuate light emission power.

21. The apparatus of claim 16, wherein the light adjuster is configured to attenuate substantially all light emission frequencies.

22. The apparatus of claim 16, further comprising a rigid support ring receiving the light detector and light adjuster and disposed within the cover.

23. An apparatus comprising:
  a cover in association with an end of an optical fiber for selectively receiving a light emission from the end of the optical fiber;
  a light adjuster received by the cover, the light adjuster comprising at least one of a light power attenuating material and a light spectrum filter material; and
  a signaling device in communication with the light adjuster, wherein the signaling device is activated when the light emission is within a predefined range as selectively adjusted by the light adjuster.

24. The apparatus of claim 23, further comprising:
  a light detector received by the cover; and
  a support mechanism in the form of a material more rigid than the cover, the support mechanism receiving the light detector and the light adjuster, and the support mechanism being received within the cover.

25. The apparatus of claim 24, wherein the light adjuster is a coating applied to the light detector.

26. The apparatus of claim 23, wherein the signaling device is a light emitting diode transforming at least a portion of the light emission to electrical energy.

* * * * *